US006826278B2

(12) United States Patent
Kiykioglu

(10) Patent No.: US 6,826,278 B2
(45) Date of Patent: Nov. 30, 2004

(54) CENTRAL OFFICE INTERFACE TECHNIQUES FOR DIGITAL SUBSCRIBER LINES

(75) Inventor: Serdar Kiykioglu, Plano, TX (US)

(73) Assignee: Centillium Communications, Inc., Fremont, CA (US)

( * ) Notice: Subject to any disclaimer, the term of this patent is extended or adjusted under 35 U.S.C. 154(b) by 44 days.

(21) Appl. No.: 09/866,498

(22) Filed: May 25, 2001

(65) Prior Publication Data

US 2002/0031217 A1 Mar. 14, 2002

Related U.S. Application Data

(63) Continuation-in-part of application No. 09/570,804, filed on May 15, 2000.
(60) Provisional application No. 60/250,531, filed on Nov. 29, 2000.

(51) Int. Cl.[7] .............................. H04M 1/00; H04M 9/00
(52) U.S. Cl. ............. 379/399.01; 379/398; 379/399.02; 379/413.02; 379/413.01; 379/413.03; 379/413.04; 379/93.05
(58) Field of Search ........................... 379/398, 399.01, 379/399.02, 413.01, 413.04, 93.05

(56) References Cited

U.S. PATENT DOCUMENTS

| 1,501,691 | A | | 7/1924 | Vennes |
| 3,828,281 | A | | 8/1974 | Chambers, Jr. |
| 3,973,089 | A | * | 8/1976 | Puckette |

(List continued on next page.)

FOREIGN PATENT DOCUMENTS

| EP | 0 346 874 A2 | 12/1989 |
| EP | 1 156 655 A2 | 11/2001 |
| EP | 1 175 077 A2 | 1/2002 |
| WO | WO 00/74328 A2 | 12/2000 |
| WO | WO 00/78013 A1 | 12/2000 |

OTHER PUBLICATIONS

PCT International Search Report, International Application No. PCT/US01/43319, Jan. 30, 2003, 5 pages.

PCT Written Opinion, International Application No. PCT/US01/43319, Mar. 3, 2003, 6 pages.

PCT International Search Report, International Application No. PCT/US02/39103, Mar. 28, 2003, 5 pages.

Liu, "Universal Filter Using Two Current–Feedback Amplifiers," Electronics Letters, vol. 13, No. 8, Apr. 13, 1995, pp. 629–630.

Primary Examiner—Forester W. Isen
Assistant Examiner—Ramnandan Singh
(74) Attorney, Agent, or Firm—Fenwick & West LLP

(57) ABSTRACT

A digital subscriber line and POTS voice interface between a telephone line and central office equipment is provided. For POTS band frequencies, a reactive impedance coupled across the two wire interface of the POTS line card, and serially coupled to the line side of the DSL coupling transformer, has an open state magnitude. The magnitude of the line side windings of the DSL coupling transformer is low at POTS band frequencies. POTS band signal power is therefore delivered to the POTS line card. For DSL band frequencies, the reactive impedance across the POTS line card has a closed state magnitude. The POTS line card is therefore essentially short-circuited at DSL band frequencies, and DSL band signal power is delivered to the DSL modem. The frequency band in which the reactive impedance transitions from an open state magnitude to a closed state magnitude corresponds to the frequency band between the POTS frequency band and the DSL frequency band. Negative impedance synthesis techniques provide compensation for the reactive impedance across the POTS line card.

22 Claims, 6 Drawing Sheets

U.S. PATENT DOCUMENTS

| | | |
|---|---|---|
| 4,439,634 A | 3/1984 | Blackburn |
| 4,764,922 A | 8/1988 | Dieter et al. ............... 370/123 |
| 4,899,382 A * | 2/1990 | Gartner |
| 5,249,224 A * | 9/1993 | Chambers ............. 379/399.01 |
| 5,343,520 A | 8/1994 | Willocx et al. |
| 5,504,807 A * | 4/1996 | Sattler et al. |
| 5,621,359 A | 4/1997 | Evert |
| 5,841,841 A | 11/1998 | Dodds et al. ............ 379/93.08 |
| 5,949,085 A | 9/1999 | Barrett |
| 6,008,976 A | 12/1999 | Pisterzi |
| 6,101,216 A | 8/2000 | Henderson et al. |
| 6,141,377 A | 10/2000 | Sharper et al. |
| 6,151,335 A | 11/2000 | Ko et al. |
| 6,185,280 B1 | 2/2001 | Jarboe et al. |
| 6,266,348 B1 | 7/2001 | Gross et al. |
| 6,269,154 B1 * | 7/2001 | Chellali et al. |
| 6,295,343 B1 * | 9/2001 | Hjartarson et al. ...... 379/93.05 |
| 6,301,337 B1 * | 10/2001 | Scholtz et al. ........... 379/93.06 |
| 6,314,180 B1 | 11/2001 | Bingel |
| 6,345,071 B1 | 2/2002 | Hamdi |
| 6,373,277 B1 | 4/2002 | Felder |
| 6,396,922 B1 * | 5/2002 | Khuat |
| 6,456,650 B1 * | 9/2002 | Cheng et al. |
| 6,520,744 B1 | 2/2003 | Verbin et al. |
| 6,573,729 B1 * | 6/2003 | Poulis et al. ................. 324/600 |

\* cited by examiner

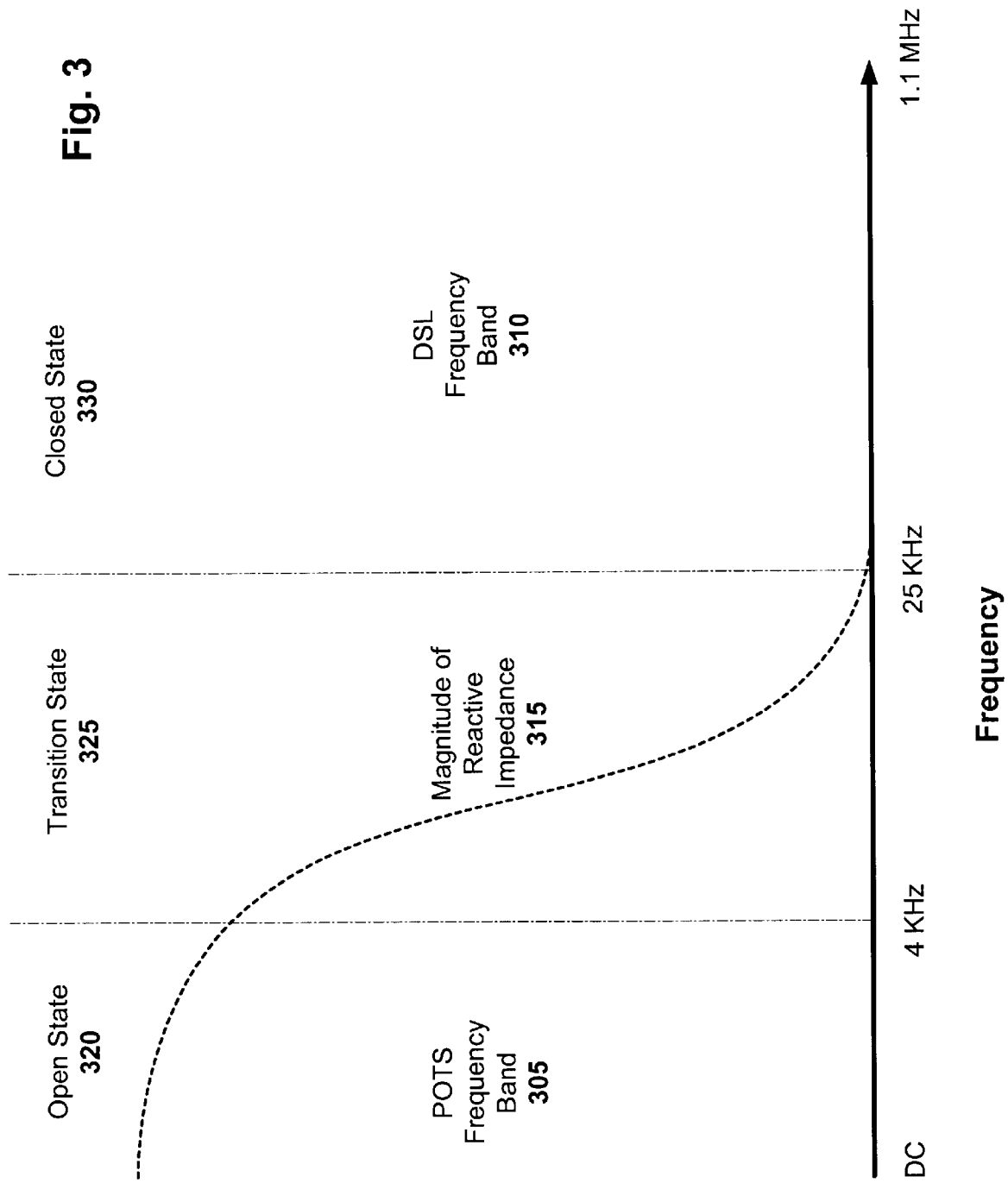

CENTRAL OFFICE INTERFACE TECHNIQUES FOR DIGITAL SUBSCRIBER LINES

RELATED APPLICATIONS

This application is a continuation-in-part of application Ser. No. 09/570,804, filed May 15, 2000, and claims the benefit of U.S. Provisional Application No. 06/250,531, filed Nov. 29, 2000.

FIELD OF THE INVENTION

The invention relates to telecommunications, and more particularly, to a digital subscriber line and POTS voice interface between a telephone line and central office equipment of a network operator providing POTS voice and digital subscriber line data services.

BACKGROUND OF THE INVENTION

A conventional telephone transmission line is typically comprised of a pair of copper conductors that connect a telephone set to the nearest central office, digital loop carrier equipment, remote switching unit or any other equipment serving as the extension of the services provided by the central office. This pair of copper conductors, which is also referred to as a twisted pair, has its leads named as tip and ring. The tip and ring nomenclature is derived from the electrical contacts of an old-style telephone plug. A number of such twisted pairs are generally bundled together within the same cable binder group.

The demand for high bandwidth data transmission over existing telephone transmission lines has led to the development of digital subscriber line (DSL) technology. Several variations of DSL technology (referred to generically as xDSL or simply DSL) are evolving, such as SHDSL (symmetric high-bit-rate DSL), HDSL2 (second-generation high-bit-rate DSL), RADSL (rate adaptive DSL), VDSL (very high-bit-rate DSL), and ADSL (asymmetric DSL). In general, a digital subscriber line is comprised of two DSL modems coupled to one another by a twisted pair. The transmit (Tx) and receive (Rx) signals of DSL communications are carried by the twisted pair.

Some DSL technologies, such as ADSL, have the advantage that ordinary voice data transmissions (referred to as Plain Old Telephone Service or POTS) can share the same telephone line with digital data transmissions. The lower frequency band of the telephone line is used for voice data, while the upper frequency bands are used for digital data. However, because each of these frequency bands operates on the same phone line, such DSL technology employs a splitter to isolate the signals of each band. More specifically, the splitter isolates the low-frequency components (POTS data) of the transmission, and the high-frequency components (digital data) of the transmission. The splitter also operates as a mixer to combine the high-frequency digital data with the low-frequency voice data, and provides the combined signal to the telephone line.

A problem with this splitter approach is that the passive elements (e.g., inductors and capacitors) that can be used to implement the low and high pass filters of the splitter are bulky and cumbersome. This added bulk requires more physical space to house the splitter, and consequently occupies more physical space in the central office of the telephone company. In the aggregate, the physical space consumption resulting from this approach is costly. Also, this approach is associated with additional material and manufacturing costs involved in building the splitters, as well as costs associated with deploying those splitters.

A silicon broadband subscriber line interface circuit (SLIC), on the other hand, provides an active discrete splitter that is more compact than a passive splitter. However, such technology requires a high-voltage, high-speed silicon process and consumes significantly more power thereby limiting the service circuit line density. Moreover, this approach requires an additional power backup in order to sustain the supported communication channels for the same time period compared to that of a POTS only service in the event of a power failure.

What is needed, therefore, is an improved interface between a telephone line and the central office that can receive and isolate (or combine) low frequency POTS data and high frequency digital data from the telephone line.

BRIEF SUMMARY OF THE INVENTION

One embodiment of the present invention provides a technique for synthesizing a negative impedance to provide a desired input impedance of a POTS line card, the POTS line card having a DC blocking capacitor of a DSL coupling transformer connected across its two wire interface. The technique includes providing a transmit line output signal of a SLIC included in the POTS line card to a receive line input of the SLIC by way of an impedance. The technique further includes phase inverting the transmit line output signal thereby effectively generating a negative impedance. The technique further includes muting the negative impedance over DSL frequency band signals, but not over POTS frequency band signals. Another embodiment of the present invention provides a negative impedance synthesis circuit operatively coupled between a transmit line output of a POTS line card SLIC and a receive line input of the POTS line card SLIC. The circuit includes an impedance in series with a unity gain phase inverter. The unity gain phase inverter is adapted to receive a transmit line output signal of the POTS line card SLIC, and to phase invert the transmit line output signal thereby synthesizing a negative impedance. The circuit further includes a low pass filter in series with the unity gain phase inverter. The low pass filter is adapted to mute the synthesized negative impedance over DSL frequency band signals, but not over POTS frequency band signals.

BRIEF DESCRIPTION OF THE DRAWINGS

FIG. 3 illustrates example frequency ranges of POTS and DSL communication signals, and how each frequency range relates to the magnitude of a reactive impedance in accordance with one embodiment of the present invention.

DETAILED DESCRIPTION OF THE INVENTION

Figure 1:
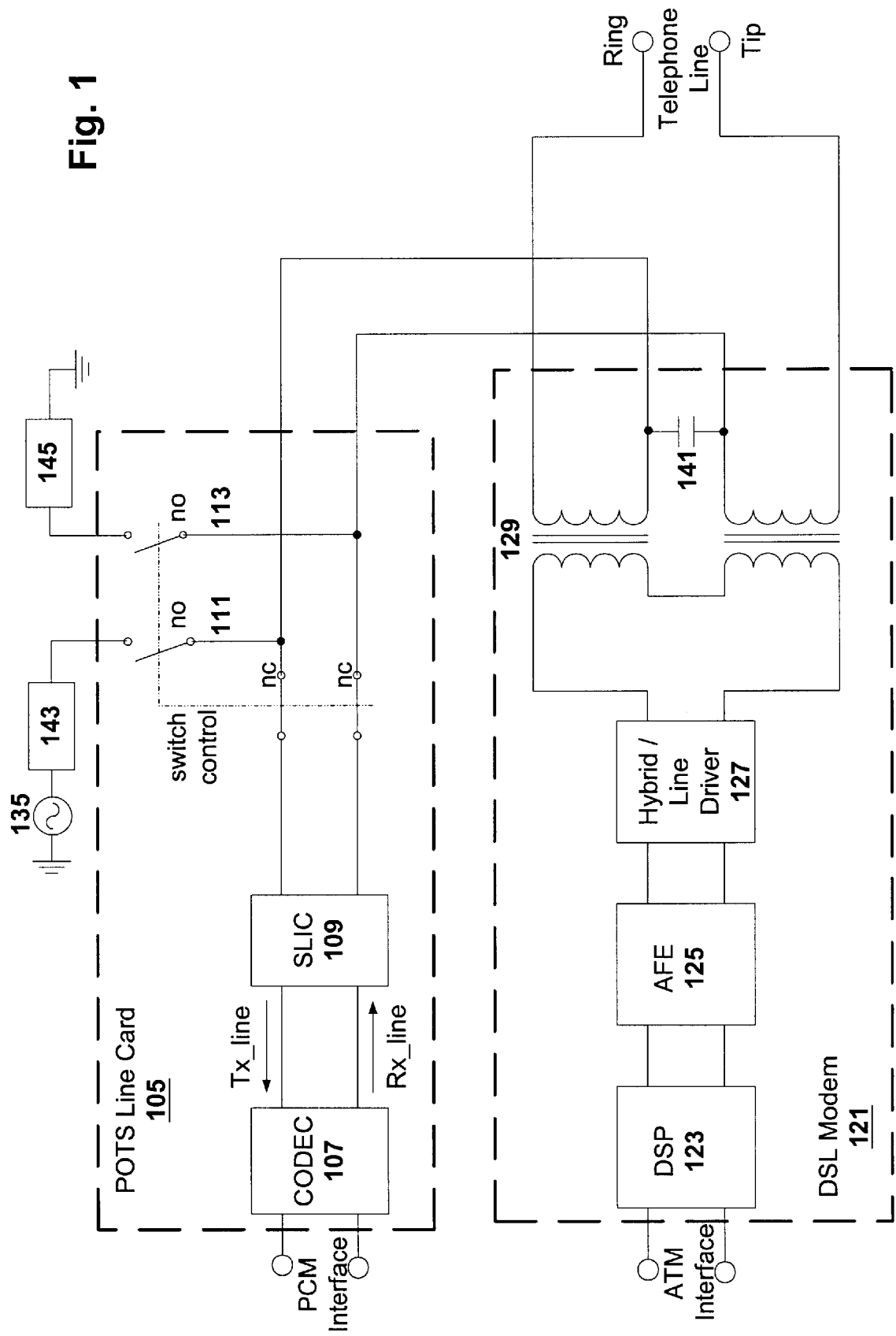
FIG. 1 is a block diagram of a central office interface for a digital subscriber line in accordance with one embodiment of the present invention.

FIG. 1 is a block diagram of a central office interface for a digital subscriber line in accordance with one embodiment of the present invention. The interface includes POTS line card 105 and DSL modem 121. A ringing circuit including source 135, coupler 143 and coupler 145 may also be included. POTS line card 105 and DSL modem 121 can be implemented, for example, as a single discrete assembly (e.g., printed circuit board), or separately as individual modules (e.g., a number of integrated circuits).

POTS line card 105 is comprised of a subscriber line interface circuit (SLIC) 109 and a programmable CODEC 107. Switches 111 and 113 may also be included in POTS line card 105 for the purpose of switching a ringing circuit in and out. Note that alternative embodiments need not include switches 111 and 113.

The SLIC 109 is used for interfacing the telephone line with programmable CODEC 107, and performs 2-to-4-wire conversion, which converts the bi-directional two-wire (tip and ring) signal from the telephone line into two pairs of one-directional transmissions. One pair is for receiving and the other pair is for transmitting. SLIC 109 is configured to synthesize a negative impedance across its transmit line (Tx_line) output and receive line (Rx_line). The circuitry employed to synthesize the negative impedance may be included in SLIC 109 or external to SLIC 109. For example, a signal path via a frequency variant two port network can be added from the transmit line output of SLIC 109 (output towards CODEC 107) to the receive line input of SLIC 109 (input from CODEC 107) by way of an impedance thereby providing a feedback loop in addition to conventional impedance synthesis network associated with SLIC 109. SLIC 109 may also include, for example, DC signaling circuits to establish, control and terminate calls. It may also include a ring generator and or an off-hook detector. Note that for purposes of simplicity, the transmit ground output of SLIC 109, which is the reference to the transmit line (Tx_line), is not shown. Similarly, the receive ground input of SLIC 109, which is the reference to the receive line (Rx_line), is not shown.

In one respect, programmable CODEC 107 is used to convert analog POTS band signals received from the line to their digital equivalent. In another respect, CODEC 107 is used to convert digital POTS band signals received from the interface to their analog equivalent for transmission onto the line. A CODEC may also have voice compression and decompression capabilities. CODEC 107 can be coupled with, for example, a PCM interface for transmission to other central offices or other networks. Those skilled in the art will recognize other interface protocols that can be implemented here as well.

DSL modem 121 is comprised of digital signal processor (DSP) 123, analog front-end (AFE) 125, hybrid/line driver 127, and transformer 129. Transformer 129 includes DC blocking capacitor 141. DSL modem 121 can, for example, employ asymmetric DSL (ADSL) technology or other DSL-based technologies. Generally, this modem converts the analog voltage received from the line to its digital equivalent. This digital data can then be applied to a network or backbone for further processing or transmission. A typical protocol implemented in the transmission of this data is the asynchronous transfer mode (ATM). Those skilled in the art will recognize other protocols that can be implemented here as well.

Transformer 129 is a balanced interface for coupling the line to the DSL circuitry. DC blocking capacitor 141 is connected between the windings on the line side of transformer 129. This DC blocking capacitor 141 prevents DC current from flowing through the line side of the transformer. Thus, any DC component of the signal received from the telephone line will not cause coupling transformer 129 to saturate. Recommendations G.992.1 and G.992.2 of the Telecommunications Standards Section of the International Telecommunication Union (sometimes designated as ITU-T) each define specifications for such a DC blocking capacitor. Recommendations G.992.1 and G.992.2 also define ADSL transceiver units. Recommendation G.992.1 refers to an asymmetric digital subscriber line (ADSL) transceiver that is an ADSL industry standard for network access at rates up to 8.192 mbit/s downstream (toward subscriber) and 640 kbit/s upstream (toward central office or network administrator). Recommendation G.992.2, on the other hand, refers to an ADSL transceiver that is a lower data rate version of a G.992.1 ADSL transceiver. Bit rates up to 1.5 mbit/s in the downstream direction and 512 kbit/s upstream are possible with this standard. Each of these recommendations is herein incorporated by reference in its entirety.

Splitterless Interface

The present invention eliminates the need for a splitter (for isolating the POTS and DSL signals), and the telephone line is applied directly across the line side of coupling transformer 129 of the central office modem. DC blocking capacitor 141 is serially coupled to the line side of transformer 129. As there is no splitter, the POTS line card is connected across capacitor 141. The reactance of capacitor 141, in conjunction with the reactance of the magnetizing inductance of transformer 129, provides a splitter function between the POTS and DSL circuits.

More specifically, the magnitude of the capacitive 141 reactance decreases as frequency increases effectively creating a short-circuit, where as the magnitude of the capacitive 141 reactance increases as frequency decreases effectively creating an open-circuit. Thus, at low frequencies (e.g., POTS band frequencies), the magnitude of the capacitive 141 reactance represents an open state, and at high frequencies (e.g., DSL band frequencies), the magnitude of the capacitive 141 reactance represents a closed state. An opposite condition applies to the windings of coupling transformer 129. As frequency decreases, the magnitude of the windings' impedance (also referred to as the reactance of the magnetizing inductance) decreases. Likewise, as frequency increases, the magnitude of the windings' impedance increases. The line side windings of the coupling transformer are effectively in series with the capacitor.

Ideally, capacitor 141 would be a perfect open-circuit (e.g., impedance with infinite magnitude) at frequencies in the POTS band, and would be a perfect short-circuit (e.g., impedance with zero magnitude) at frequencies in the DSL bands. The line side of transformer 129 would therefore be open-circuited by capacitor 141 at POTS band frequencies. As such, the POTS line card 105 would consequently receive the entire POTS signal power from the telephone line. On the other hand, the POTS line card 105 would be short-circuited by capacitor 141 at DSL band frequencies. As such, the DSL modem would consequently receive the entire DSL signal power from the telephone line.

As such ideal conditions are generally not practical, a more realistic approach is provided. For POTS band frequencies, the magnitude of the capacitive 141 reactance is in its high or open state, and the magnitude of the impedances of the windings are effectively short-circuits (closed state). As such, at POTS band frequencies, the POTS circuit interfaces with the line as if the DSL circuit is not present. For DSL frequencies, the magnitude of the capacitive 141 reactance is in its low or closed state, and the magnitudes of the impedances of the windings are effectively open-circuits (high state). As such, at DSL band frequencies, the DSL circuit interfaces with the line as if the POTS circuit is not present. Thus, capacitor 141 and line side windings of coupling transformer 129 provide the functionality of a splitter. The gap in the frequency spectrum between the POTS band and the DSL band provides capacitor 141 an interstate range for transitioning from an impedance having a high magnitude to an impedance having a low magnitude.

In one embodiment, capacitor 141 has a value in a range as specified by ITU-T Recommendations G.992.1 and G.992.2 (e.g., 20 to 35 nanofarads). In other embodiments, capacitor 141 has a larger value (e.g., 35 nanofarads to 0.5 microfarads). Note that the actual selected value of capacitor 141 depends on factors such as the desired sound quality of the communication channel, the desired level of attenuation of DSL signals entering the POTS band, the desired frequency response of DSL signals, and given industry regulations. As the value of capacitor 141 increases, the level of attenuation of DSL signals entering the POTS band increases. However, while increased capacitance provides better frequency response for the DSL band, it disturbs the structural impedance of the POTS band. As such, a negative capacitance is needed to compensate for the effect of capacitor 141 on the structural impedance of the POTS band. Note that the attenuating effect of capacitor 141 with respect to the DSL band remains intact, while the negative capacitance maintains the desired POTS structural impedance.

In more detail and by way of example, the structural impedance of central office POTS line card 105 is typically about 900 ohms in series with 2.16 microfarads capacitance for applications in the United States. Connecting the capacitor 141 across the two wire interface of POTS line card 105 causes a two-wire and four-wire impedance mismatch and degraded transmission characteristics (e.g., as set forth by the applicable standards such as Bellcore or equivalent standards). This generally results in a less than optimal sound quality of the POTS communication channel. However, this impedance mismatch can generally be compensated for by properly programming CODEC 107 included in the POTS line card by synthesizing the proper two-wire and four-wire impedance, and the proper transmit and receive path frequency equalization.

For example, programmable CODEC 107 can be programmed to synthesize desired transmission characteristics by employing a DSP filter circuitry of the CODEC. CODEC 107 can also be programmed to compensate for physical components connected across the two wire interface of the POTS line card 105. In general, a software tool with integrated circuit simulation program (e.g., PSPICE or other simulation software) is available from the CODEC supplier. This program can be used to calculate and simulate the necessary DSP code to implement the desired transmission characteristics without employing any additional hardware circuitry to an existing POTS design. Thus, a full DSP implementation is possible. Once the desired transmission characteristics are identified and the physical circuit network is modeled, the simulation program can be used to obtain the desired performance from POTS line card 105. The DSP filter coefficients can then be calculated thereby allowing the programmable CODEC (in which the DSL filters have been implemented) to synthesize the desired circuit response.

In some embodiments, however, limitations associated with the given CODEC (e.g., DSP filter circuitry limitations) may require additional circuitry in order to achieve optimal sound quality of the POTS communication channel. For instance, a CODEC may have been designed to synthesize structural impedance values in a limited fashion, such as the 900 ohms resistance in series with 2.16 microfarads of capacitance. As such, larger values of a physical capacitor present at the transmission port of the POTS line card may be too large for the rated capacity of the DSP filter inside the CODEC thereby causing an unacceptable degree of impedance mismatch. In such a case, a negative impedance can be synthesized to effectively adjust the impedance mismatch caused by the physical capacitor so that the resulting overall impedance mismatch is not beyond the scope of the rated capacity of the DSP filter inside the CODEC. The CODEC can then perform any necessary compensation as previously explained.

A negative impedance network essentially renders the physical impedance invisible (nulled) to an independent voltage or current stimulus by diverting the current resulting from the voltage or current stimulus that would normally flow across the physical impedance. In response to the diverted current flowing into the negative impedance synthesis network, the physical impedance is rendered invisible or nulled. Note that a physical capacitor can also be made to appear larger or smaller (as opposed to nulled) through this current diversion. In accordance with one embodiment of the present invention, the physical capacitance used to filter out DSL frequencies from the POTS band (e.g., DC blocking capacitor 141) is effectively nulled by synthesizing an appropriate negative impedance (in this case a negative capacitance).

The synthesized negative impedance is frequency variant in that it only affects a specific band of frequencies (e.g., the POTS band frequencies). For frequencies outside that specific band of frequencies, the synthesized negative impedance is muted (e.g., gradually reduced and nulled above a preset frequency) so that its effect is essentially disabled. One reason for this frequency variant quality is that the physical capacitance is desired to be present within the higher DSL frequency band. Another reason is that the POTS SLIC circuit (e.g., SLIC 109 of FIG. 1) may not have sufficient current budget (diverting current) to synthesize a negative impedance in the higher frequency bands. Typically, a SLIC designed for voice applications has adequate current budget only for DC line feed plus AC induced noise current and voice transmission. To synthesize the negative impedance within the DSL band may cause the SLIC's current budget to be exceeded causing the SLIC to saturate thereby disturbing the voice transmission and the DC line feed. Thus, a frequency variant negative capacitance is provided. A model of negative capacitance synthesis circuitry for providing additional negative frequency variant capacitance will now be discussed in reference to FIGS. 2a–c.

Figure 2A:
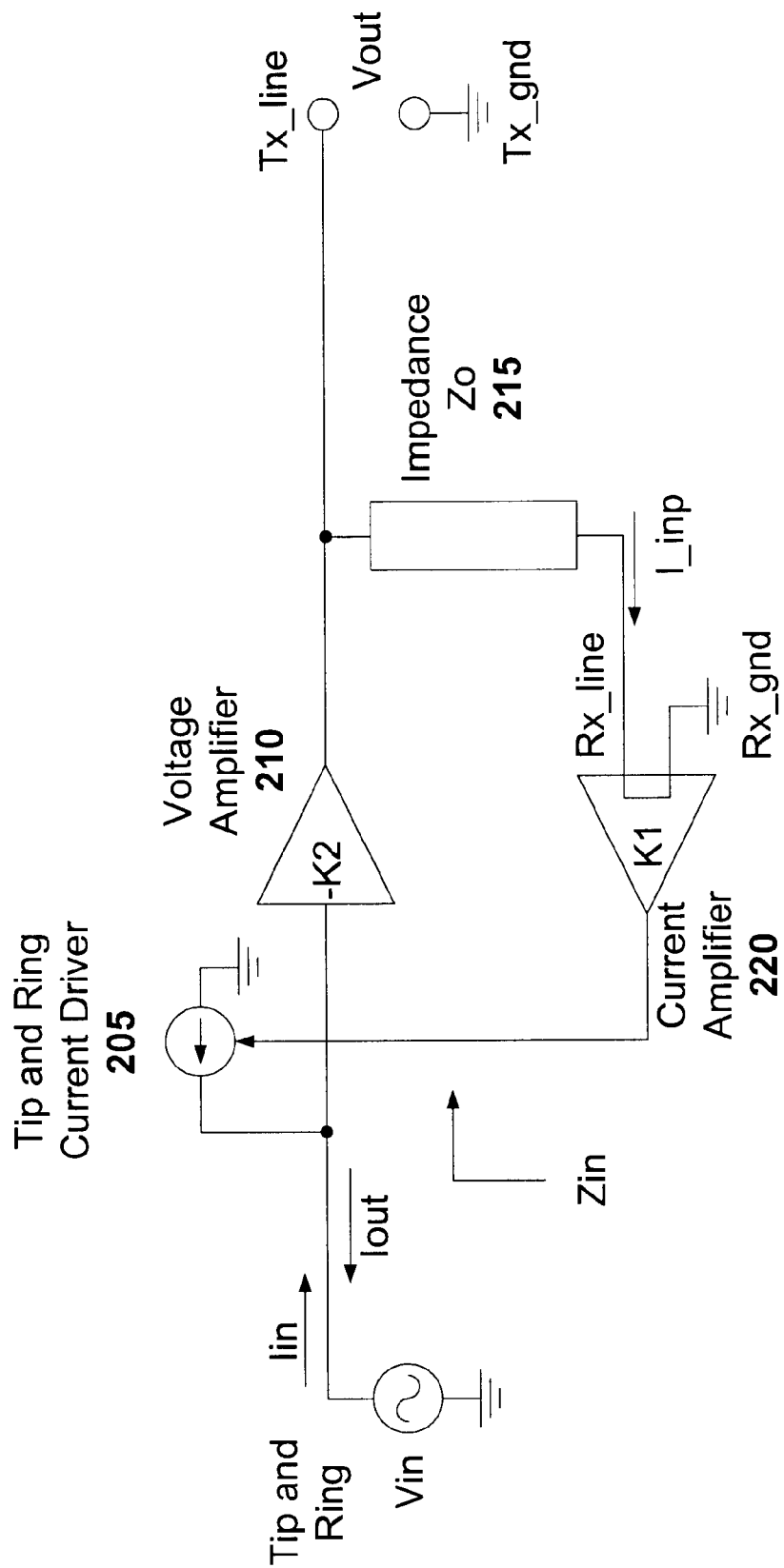
FIGS. 2a, 2b, and 2c illustrate models of negative impedance synthesis circuitry in accordance with one embodiment of the present invention.

FIG. 2a illustrates a model of negative impedance synthesis circuitry in accordance with one embodiment of the present invention. The model includes a tip and ring current driver 205, a voltage amplifier 210, a current amplifier 220, and an impedance Zo 215. For the sake of clarity, note the following definitions:

Vin: Input voltage received from tip and ring;

Vo: Output voltage of transmit line;

Iin: Input current received from tip and ring;

I_inp: Input current of receive line;

Iout: Output current of receive line;

K1: Current amplifier gain;

K2: Voltage amplifier gain;

Zo: Impedance; and

Zi: Negative synthesized impedance at the tip and ring.

The negative synthesized impedance at the tip and ring (Zi) can be derived (in the s domain) as follows:

$$Zi(s)=Vin(s)/Iin(s) \quad \text{(Equation 1)}$$

$$Vo(s)=Vin(s)*(-K2) \quad \text{(Equation 2)}$$

$$I\_inp(s)=Vo(s)/Zo(s) \quad \text{(Equation 3)}$$

$$I(s)=K1* I\_inp(s) \quad \text{(Equation 4)}$$

Substituting Equation 3 in Equation 4:

$$I(s)=K1* Vo(s)/Zo(s) \quad \text{(Equation 5)}$$

Substituting Vo(s) in Equation 5:

$$I(s)=K1*(-K2)* Vin(s)/Zo(s) \quad \text{(Equation 6)}$$

$$I(s)=-Iin(s) \quad \text{(Equation 7)}$$

Yielding:

$$Zi(s)=Vin(s)/(K1*K2*Vin(s)/Zo(s)) \quad \text{(Equation 8)}$$

$$Zi(s)=Zo(s)/(K1*K2) \quad \text{(Equation 9)}$$

This model of negative impedance synthesis circuitry may be implemented as part of the SLIC of a POTS line card. In such an embodiment (assuming a current feed electronic SLIC), the structural impedance of the POTS line card is effectively synthesized by the SLIC. Alternatively, the model of negative impedance synthesis circuitry can be implemented externally to the SLIC. In either case, the transmit line output of the SLIC is feedback to the receive line input by way of negative impedance synthesis circuitry in accordance with the present invention. Note that numerous SLIC configurations and models can be employed in the context of the present invention. The present invention is flexible in that its underlying principles can be equally applied to all SLIC types regardless of topology (e.g., a current feed or voltage feed topologies). Regardless of SLIC topology, a feedback loop is established to perform the impedance synthesis loop as described herein. For example, the circuit model shown in FIG. 2a has a current feed into a load and voltage feedback topology that corresponds to a current feed SLIC. However, a circuit employing a voltage feed into a load and current feedback topology could be used for a voltage feed SLIC. Such implementation variations will be apparent to one skilled in the art in light of this disclosure.

As illustrated by the model, an impedance Zo 215 is placed between the output of voltage amplifier 210 and the receive line (Rx_line) input of current amplifier 220. Note that the output of voltage amplifier 210 is the transmit line (Tx_line), and the input of the current amplifier 220 is the receive line (Rx_line). In the context of a current feed electronic SLIC operating in accordance with the principles of the present invention, the output of the voltage amplifier 210 represents the transmit line from the SLIC to the CODEC. This voltage output is fed back to the input of current amplifier by way of impedance 215. As such, the receive line from the CODEC to the SLIC is essentially summed with the voltage feedback. The output of the current amplifier 220 drives the receive line load onto the tip and ring. Impedance Zo 215 is scaled by the voltage and current gain values as determined by the gain blocks 210 and 220, where K2 and K1 are the respective scalar gain factors. The resulting scaled impedance represents Zi.

The synthesized negative impedance Zi acts as a shunt impedance across the DC blocking capacitor and the POTS structural impedance thereby yielding a total input impedance that equals the desired input impedance only. As such, the effect of the DC blocking capacitor is effectively eliminated within the POTS band. With respect to the DSL band, the synthesized negative impedance can be muted (e.g., with filtering) so that the attenuating effect of the DC blocking capacitor prevails at its rated value. Thus, the splitter function provided by the DC blocking capacitor (in conjunction with the coupling transformer windings) remains intact for the DSL band. Note that the inductive reactance of the coupling transformer windings typically have a negligible impact on the input impedance of the POTS line card. This is because the value of reactance within the POTS passband is small compared to the structural impedance of the POTS circuitry. Thus, the most significant contributor to the measured impedance across the tip and ring is the DC blocking capacitor. Further note that the larger the value of the DC blocking capacitor, the less the DSL band will be impacted by POTS band frequencies.

This model of negative capacitance synthesis circuitry (in conjunction with the conventional impedance synthesis network associated with POTS SLIC circuitry) can be configured to provide an overall structural impedance that is substantially equal to the desired POTS line card input impedance (e.g., 900 ohms in series with a 2.16 microfarads capacitance). Note that other desired input impedance values can be synthesized as well. The principles of the present invention are flexible and may be applied to provide a negative capacitance synthesis circuit that can scale a wide range of Zo impedance 215 values to a particular desired negative impedance. As such, a POTS plus DSL circuit interface is enabled for numerous applications (both domestic and international) with no limitation due to specifications associated with given POTS and DSL services (as defined by the likes of industry standards/regulations and network operators). Equations 1 through 9 and the circuit models provided herein will give rise to a number of physical implementations for the negative capacitance synthesis circuit. As such, the present invention is not intended to be limited to any one physical implementation. For example, as the model shown in FIG. 2a illustrates a current feed into a load and voltage feedback topology, it will further be apparent that a voltage feed into a load and current feedback topology may also be employed in accordance with the present invention.

Figure 2B:
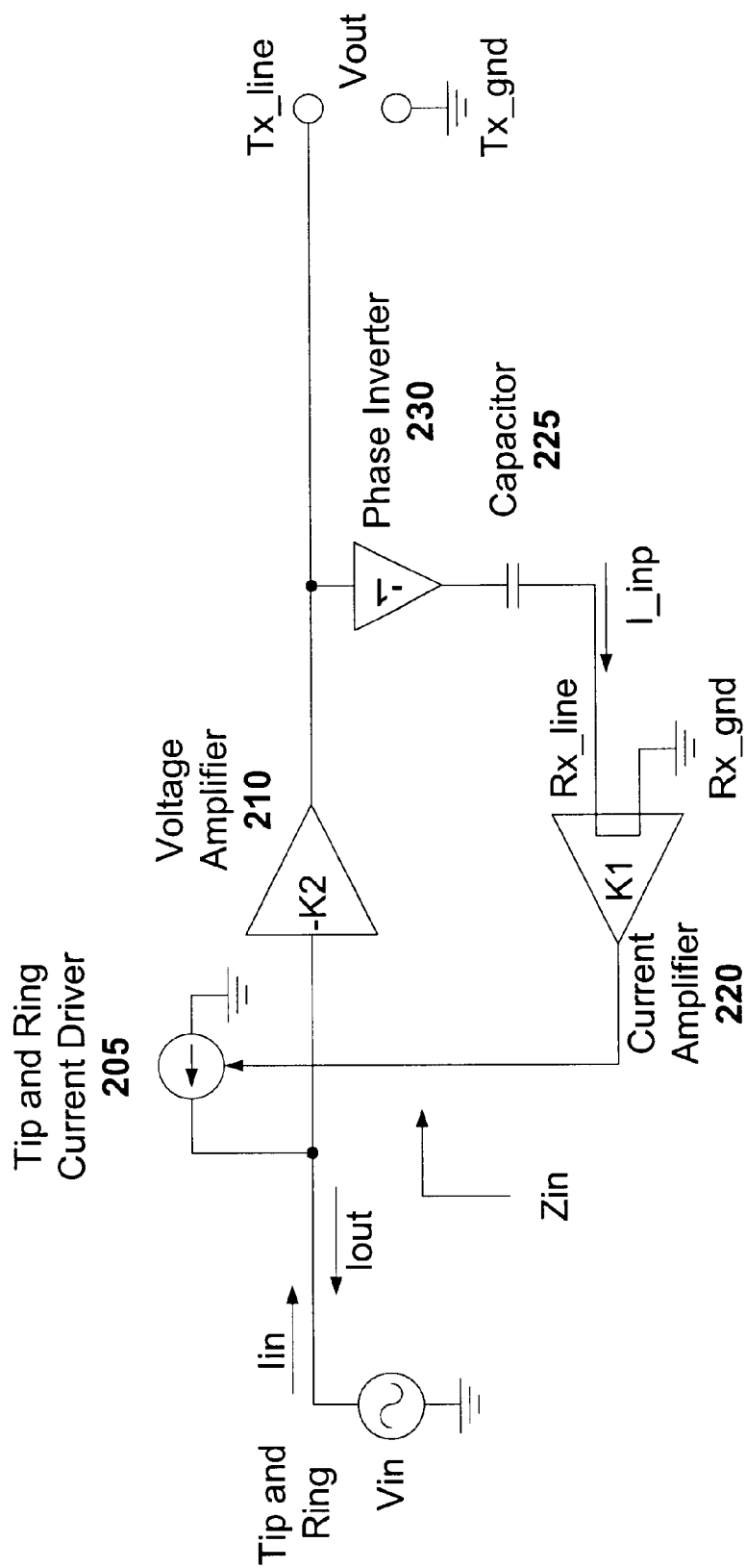

In reference now to FIG. 2b, it can be seen that impedance Zo 215 of FIG. 2a can be realized by an active unity gain phase inverter 230 in series with a capacitor 225. Generally, connecting an active unity gain phase inverter in series with an impedance synthesizes a negative of that impedance. The negative impedance is scaled by the value of the gain blocks employed as described by the equations 1 through 9. Thus, the value of capacitor 225 generally determines the negative capacitance value that appears at the tip and ring of the POTS line card. As such, the magnitude of the synthesized negative capacitance in one embodiment is substantially equal to that of the DC blocking capacitor. However, factors such as component tolerances, temperature variations, component aging and parasitics (e.g., due to printed circuit board layout) typically preclude an ideal match between the DC blocking capacitor magnitude and the synthesized impedance magnitude. As such, the structural impedance of the POTS line card may be slightly off thereby causing an impedance mismatch and a less than optimal sound quality of the POTS communication channel. Recall, however, that this impedance mismatch can generally be compensated for by properly programming a CODEC included in the POTS line card.

Figure 2C:
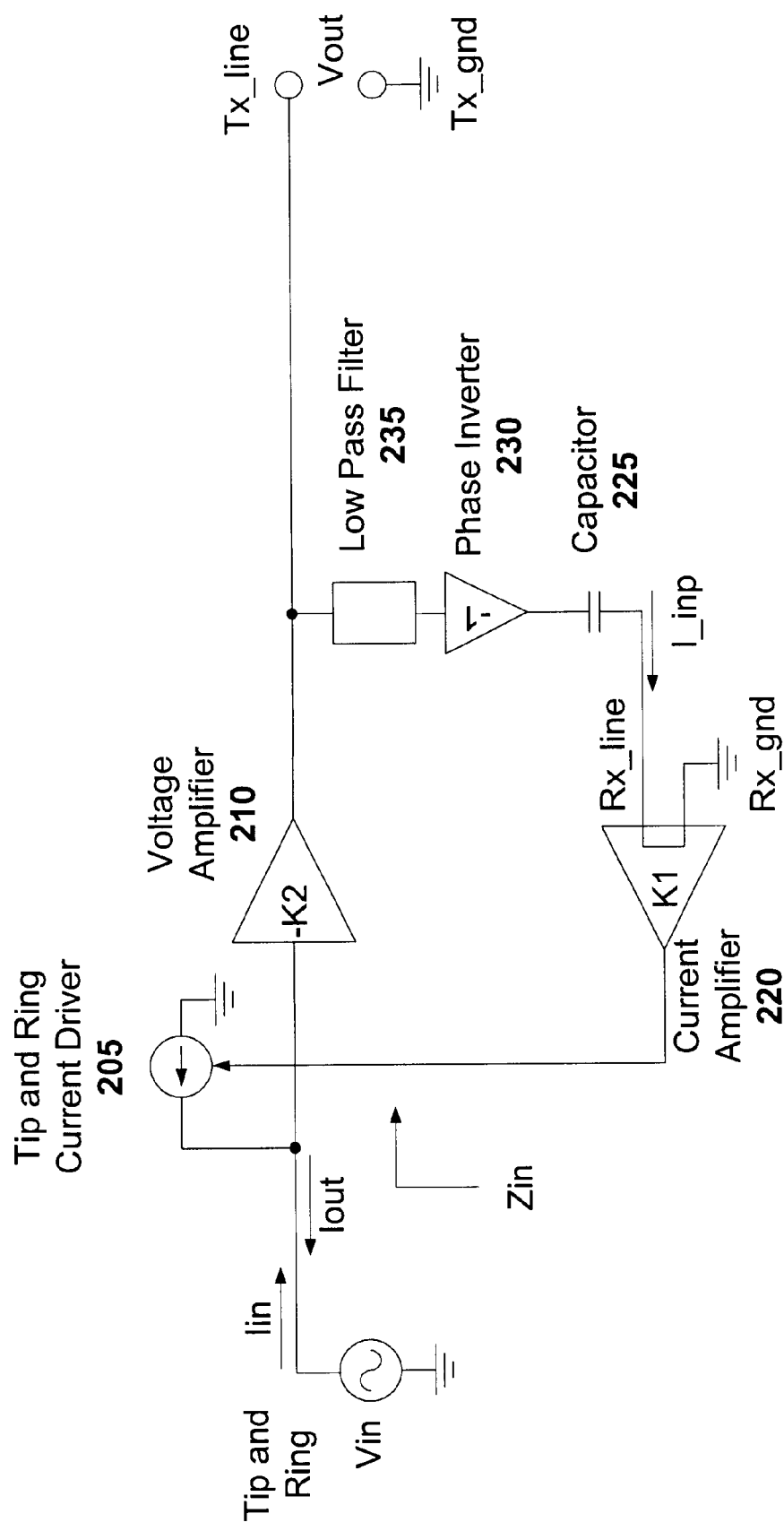

In order to maintain the synthesized negative impedance across the POTS frequency band, but to eliminate it across DSL band, the phase inverter can be cascaded with a low pass filter 235 as shown in FIG. 2c. In this sense, the synthesized negative impedance is said to be frequency variant. Low pass filter 235 has a cutoff frequency above the POTS pass band. For example, in one embodiment low pass filter 235 is a second order low pass filter having a cut off frequency in a range from 4 KHz to 6 KHz. Note that the cutoff frequency may be lower or higher depending on factors such as the given POTS band and DSL band frequency spectrums. Thus, the impedance synthesis circuitry operates as a phase inverter within the POTS band thereby synthesizing the negative capacitance to compensate for the DC blocking capacitor. Within the DSL band (which falls within the stop band of the low pass filter 235), however, the phase inverter is effectively disabled thereby allowing the DC blocking capacitor to fulfill its attenuating purpose. Note that the order of low pass filter 235 can vary depending on the desired result. Generally, the greater the filter order, the greater the roll off rate at the cut off frequency.

Implementation Details

Generally, there are many SLICs and CODECs available. Depending on the vendors used, the SLIC and CODEC of a POTS line card may produce noise that is outside the POTS frequency band, but low enough in frequency that the noise may not be effectively filtered by the DC blocking capacitor in conjunction with the windings of the coupling transformer. Although such noise (which may manifest as a faint hissing sound during silent periods of a phone call) is generally not a problem for POTS band applications (e.g., as long as the required idle channel noise specifications are met as set forth by applicable standards), its presence within the DSL band may limit the maximum connect rate that can be achieved for that particular DSL. To eliminate such noise, additional filtering can be provided. For example, a low pass filter can be deployed across the POTS line card two wire interface. Note that such additional filtering is compensated for in the same manner that the DC blocking capacitor is compensated for. Whether such a low pass filter is employed depends on factors such as the desired sound quality and desired idle channel noise level. For instance, specification TR-NWT-000057 (Telcordia, Inc. formerly Bellcore, Inc.) specifies an idle channel noise level that may require such filtering. Note, however, that meeting this specification is not necessary for the present invention to operate.

FIG. 3 illustrates example frequency ranges of POTS and DSL communication signals, and how each frequency range relates to the magnitude of a reactive impedance in accordance with one embodiment of the present invention. As shown, POTS frequency band 305 ranges from approximately DC to 4 KHz. The DSL frequency band 310, in this example, ranges from approximately 25 KHz up to 1.1 MHz. Those skilled in the art understand that some DSL technologies provide separate bands for upstream data and downstream data. For example, an ADSL upstream data channel might operate within a frequency spectrum ranging from approximately 85 to 95 KHz. An ADSL downstream data channel might operate within a frequency spectrum ranging from approximately 100 KHz to 500 KHz.

Also shown in FIG. 3 is the magnitude of a reactive impedance 315 relative to frequency bands 305 and 310. This reactive impedance 315 can be, for example, serially connected to the line side of a DSL coupling transformer as a DC blocking capacitor (e.g., 141 of FIG. 1). As the frequency increases, the magnitude of the reactive impedance 315 decreases. In the embodiment shown, the reactive impedance 315 has a high magnitude region referred to as open state 320, a transition region referred to as transition state 325, and a low magnitude region referred to as closed state 330.

The open state 320 corresponds to magnitudes of reactive impedance 315 that are responsive to signals in the POTS frequency band 305. POTS signals are intended to be received by, for example, a POTS line card or its equivalent. The closed state 330 corresponds to magnitudes of reactive impedance 315 that are responsive to signals in the DSL frequency band 310. Such signals are intended to be received by, for example, a DSL modem or its equivalent. The transition state 325 corresponds to magnitudes of reactive impedance 315 that are responsive to signals in the frequency band between the highest POTS band 305 frequency (e.g., 4 KHz) and the lowest DSL band 310 frequency (e.g., 25 KHz). Thus, reactive impedance 315 can have an open state magnitude, a closed state magnitude, or a transition state magnitude.

In one embodiment, reactive impedance 315 is provided by a capacitor ranging from approximately 27 nanofarads to 47 nanofarads. In alternative embodiments, reactive impedance 315 is provided by a capacitor ranging from approximately 47 nanofarads to 0.4 microfarads. However, the value of the capacitor depends on factors such as the applicable specification or ITU recommendation and the particular application. Thus, the above ranges are not intended as limitations, but merely as example ranges. The type of capacitor may be a 250 volt (or higher) metalized polyester self-healing capacitor, although those skilled in the art will recognize that the type of capacitor can vary depending, for instance, on the particular application.

The impedance of the capacitor is calculated by the equation: $-j/(2*\pi*F*C)$ where F is the frequency of the signal applied to the capacitor, and C is the value of the capacitor. For example, the magnitude of the impedance of a 0.3 microfarad capacitor at 2 KHz is approximately 265 ohms. The magnitude of the impedance of that capacitor at 4 KHz is approximately 133 ohms. The magnitude of the impedance of that capacitor at 25 KHz is approximately 21 ohms. The magnitude of the impedance of that capacitor at 500 KHz is approximately 1 ohm. In this embodiment then, the open state 320 of the reactive impedance 315 would provide an impedance having a magnitude of approximately 133 ohms or greater, while the closed state 330 would provide an impedance having a magnitude of approximately 21 ohms or less.

Depending on what state the magnitude of reactive impedance 315 is in at any one frequency, a portion of the signal power corresponding to that frequency will be delivered to a POTS line card means. Likewise, a portion of the signal power corresponding to that frequency will be delivered to a DSL modem means. As the magnitude of reactive impedance 315 decreases at increasing frequencies, the greater the portion of the signal power corresponding to those frequencies that is delivered to the DSL modem means, and less signal power corresponding to those frequencies is delivered to the POTS line card means. On the other hand, as the magnitude of reactive impedance 315 increases at decreasing frequencies, the greater the portion of the signal power corresponding to those frequencies that is applied to the POTS band line card means, and less signal power corresponding to those frequencies is delivered to the DSL modem means.

Impedance 315 can be implemented so as to optimize the amount of signal power at any one frequency that is to be delivered to one of the POTS line card means and the DSL modem means. Optimal amounts, for example, might correlate to the smallest portion of DSL band signal power being delivered to the POTS line card given a particular frequency spectrum. Conversely, an optimal amount might correlate to the smallest portion of POTS band signal power being delivered to the DSL modem given a particular frequency spectrum. Those skilled in the art understand that the particular frequency spectrum is dependent, for example, on the type of DSL modem employed, the system bandwidth requirements for upstream and downstream communication channels, and the frequency range of those communication channels.

Figure 4:
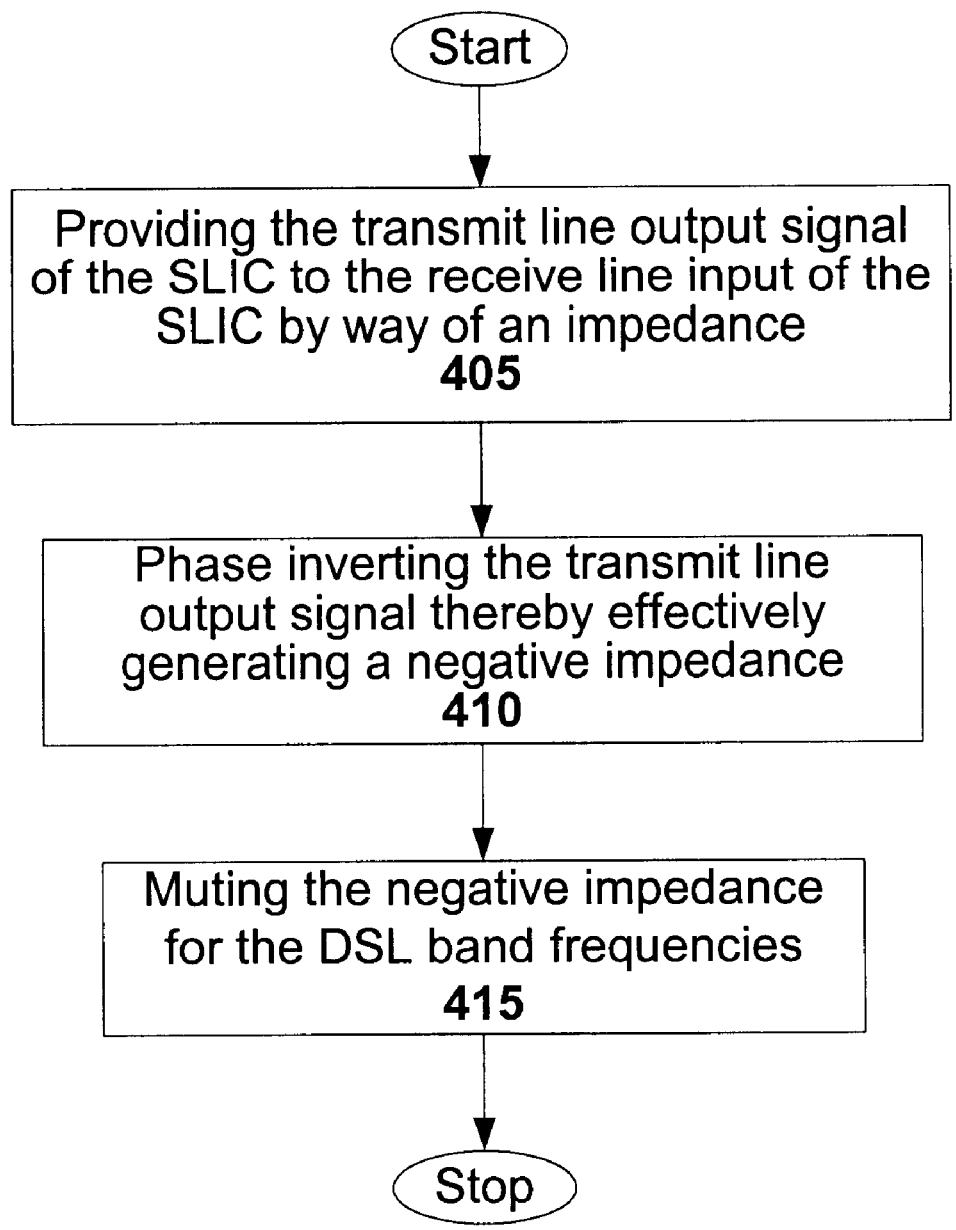
FIG. 4 illustrates a method for synthesizing a negative impedance to provide a desired input impedance of a POTS line card at the tip and ring.

FIG. 4 illustrates a method for synthesizing a negative impedance to provide a desired input impedance of a POTS line card at the tip and ring. The method may be implemented, for example, to compensate for a DC blocking capacitor that is coupled across the two wire interface of the POTS line card in accordance with one embodiment of the present invention. The method begins with providing 405 the transmit line output signal of the SLIC to the receive line input of the SLIC by way of an impedance. In one embodiment, this impedance is realized by a capacitor that is substantially equal in value to the DC blocking capacitor. The method further includes phase inverting 410 the transmit line output signal thereby effectively generating a negative impedance. This step can be performed, for example, by a conventional unity gain phase inverter coupled in series with the impedance. The method proceeds with muting 415 the negative impedance over the DSL frequency band. This allows the DC blocking capacitor to fulfill its attenuating purpose as earlier described. This step can be performed, for example, by a low pass filter having a cut off frequency above the POTS frequency band (e.g., 5 KHz).

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for interfacing a telephone line having a first wire and a second wire with a central office, the system comprising:

a DSL circuit connected to a coupling transformer having a line side and a circuit side, the DSL circuit adapted to process DSL frequency band signals received from the telephone line, wherein the line side of the transformer is coupled between the first and second wires of the telephone line;

a DC blocking capacitor serially coupled between windings of the line side of the transformer, the DC blocking capacitor having an impedance;

a POTS circuit having a two wire interface, and adapted to process POTS frequency band signals received from the telephone line, wherein the two wire interface of the POTS circuit is operatively coupled across the DC blocking capacitor; and a negative impedance synthesis circuit operatively coupled to the POTS circuit, the negative impedance synthesis circuit configured to synthesize an impedance that compensates for the impedance of the DC blocking capacitor.

2. The system of claim 1 wherein the DC blocking capacitor has an open state magnitude in response to POTS frequency band signals.

3. The system of claim 1 wherein the DC blocking capacitor has a closed state magnitude in response to DSL frequency band signals.

4. The system of claim 1 wherein the POTS circuit includes a CODEC that is programmed to compensate for effects the DC blocking capacitor has on POTS band structural impedance.

5. The system of claim 1 wherein the negative impedance synthesis circuit includes a unity gain phase inverter in series with a capacitor that is substantially equal in value to the DC blocking capacitor value.

6. The system of claim 5 wherein a transmit line output signal of the POTS circuit is provided to an input of the unity gain phase inverter and a receive line input of the POTS circuit is coupled to the capacitor in series with the unity gain phase inverter.

7. The system of claim 1 wherein the negative impedance synthesis circuit includes a low pass filter for muting the synthesized impedance in the DSL frequency band.

8. The system of claim 1 wherein the negative impedance synthesis circuit includes a low pass filter in series with a unity gain phase inverter in series with a capacitor that is substantially equal in value to the DC blocking capacitor value.

9. A method for synthesizing a negative impedance to provide a desired input impedance of a POTS line card, the POTS line card having a DC blocking capacitor of a DSL coupling transformer operatively coupled across its two wire interface, the method comprising:

providing a transmit line output signal of a SLIC included in the POTS line card to a receive line input of the SLIC by way of an impedance;

phase inverting the transmit line output signal thereby synthesizing a negative impedance that compensates for impedance of the DC blocking capacitor; and muting the negative impedance over DSL frequency band signals, but not over POTS frequency band signals.

10. The method of claim 9, wherein the impedance is a capacitor that is substantially equal in value to the DC blocking capacitor value.

11. The method of claim 9, wherein the phase inverting step is performed by a unity gain phase inverter in series with the impedance.

12. The method of claim 9, wherein the muting step is performed by a low pass filter in series with the impedance, the low pass filter having a cut off frequency above the POTS frequency band.

13. A negative impedance synthesis circuit operatively coupled between a transmit line output of a POTS line card SLIC and a receive line input of the POTS line card SLIC, the circuit comprising:

an impedance;

a unity gain phase inverter in series with the impedance, the unity gain phase inverter adapted to receive a transmit line output signal of the POTS line card SLIC, and to phase invert the transmit line output signal thereby synthesizing a negative impedance;

a low pass filter in series with the unity gain phase inverter, the low pass filter adapted to mute the synthesized negative impedance over DSL frequency band signals, but not over POTS frequency band signals;

wherein the synthesized negative impedance compensates for an impedance mismatch caused by operatively coupling the POTS line card SLIC to a splitterless interface.

14. The circuit of claim 13, wherein the impedance is a capacitor.

15. The circuit of claim 13, wherein the low pass filter is a second order filter and has a cutoff frequency above the POTS frequency band.

16. A negative impedance synthesis circuit operatively coupled between a transmit line output of a POTS line card SLIC and a receive line input of the POTS line card SLIC, the circuit comprising:

an impedance;

a phase inverting means in series with the impedance and adapted to receive a transmit line output signal of the POTS line card SLIC, the phase inverting means for phase inverting the transmit line output signal thereby synthesizing a negative impedance;

a filtering means in series with the phase inverting means, the filtering means for muting the synthesized negative impedance over DSL frequency band signals, but not over POTS frequency band signals;

wherein the synthesized negative impedance compensates for an impedance mismatch caused by operatively coupling the POTS line card SLIC to a splitterless interface.

17. The circuit of claim 16, wherein the impedance is a capacitor.

18. The circuit of claim 16, wherein the filtering means is a second order low pass filter having a cutoff frequency above the POTS frequency band.

19. The circuit of claim 16, wherein the phase inverting means is a unity gain phase inverter.

20. A system for interfacing a telephone line with a central office, the system comprising:

a transformer having split primary windings and secondary windings, the primary windings adapted to be coupled to a telephone line;

a DSL interface coupled to the secondary windings for receiving DSL data signals;

a Plain Old Telephone Service (POTS) interface coupled to the split primary windings for receiving POTS signals; and a dc blocking capacitor serially coupling the split primary windings and coupled to the POTS interface, the dc blocking capacitor for shorting the POTS interface from the primary windings for input signals having frequencies above a POTS frequency range.

21. The interface of claim 20, further comprising:

a negative impedance network for synthesizing a negative impedance for adjusting an impedance mismatch between the telephone line and the POTS interface due to impedance associated with the dc blocking capacitor.

22. The interface of claim 21, wherein the synthesized negative impedance only affects POTS band frequencies.

* * * * *

UNITED STATES PATENT AND TRADEMARK OFFICE
CERTIFICATE OF CORRECTION

PATENT NO. : 6,826,278 B2 Page 1 of 1
DATED : November 30, 2004
INVENTOR(S) : Serdar Kiykioglu It is certified that error appears in the above-identified patent and that said Letters Patent is hereby corrected as shown below:

Title page,
Item [56], References Cited, OTHER PUBLICATIONS, insert the following:
-- PCT International Search Report, International Application No. PCT/US02/21053, October 29, 2002, 3 pages --

Signed and Sealed this

Third Day of May, 2005

JON W. DUDAS
*Director of the United States Patent and Trademark Office*